(12) United States Patent
Zelivinski et al.

(10) Patent No.: US 8,831,780 B2
(45) Date of Patent: Sep. 9, 2014

(54) SYSTEM AND METHOD FOR CREATING VIRTUAL PRESENCE

(76) Inventors: Stanislav Zelivinski, North Potomac, MD (US); Arkady Linshitz, North Potomac, MD (US)

( * ) Notice: Subject to any disclaimer, the term of this patent is extended or adjusted under 35 U.S.C. 154(b) by 173 days.

(21) Appl. No.: 13/542,387

(22) Filed: Jul. 5, 2012

(65) Prior Publication Data

US 2014/0012417 A1 Jan. 9, 2014

(51) Int. Cl.
*B25J 9/00* (2006.01)
*B25J 5/00* (2006.01)
*G05D 1/00* (2006.01)
G05D 1/02 (2006.01)
B25J 9/16 (2006.01)

(52) U.S. Cl.
CPC .... *G05D 1/0044* (2013.01); *G05B 2219/40161* (2013.01); *G05D 1/0246* (2013.01); *B25J 9/1689* (2013.01); *Y10S 901/01* (2013.01); *Y10S 901/50* (2013.01)
USPC ................. 700/257; 700/259; 901/1; 901/50

(58) Field of Classification Search
CPC ........ B25J 9/1689; B25J 19/023; B25J 5/007; B25J 9/0003; B25J 5/00; B25J 13/06; H04N 7/185; H04N 21/4788; H04N 7/15; H04N 7/141; G06F 3/033; G06F 3/14; G05D 1/0038; G05D 1/0044; G05D 1/0246; G05D 2201/0207; G05D 1/0251; G05B 2219/40169; G05B 2219/40174; Y10S 901/01
USPC ......... 700/248, 249, 250, 253, 255, 257, 258, 700/259, 262, 264; 900/1, 46, 47, 50
See application file for complete search history.

(56) References Cited

U.S. PATENT DOCUMENTS

| 6,845,297 B2 * | 1/2005 | Allard ............................ 700/259 |
| 7,184,559 B2 * | 2/2007 | Jouppi ............................. 381/92 |
| 2002/0141595 A1 * | 10/2002 | Jouppi ............................. 381/2 |
| 2004/0167666 A1 * | 8/2004 | Wang et al. ................... 700/245 |
| 2006/0082642 A1 * | 4/2006 | Wang et al. ................. 348/14.05 |
| 2007/0156286 A1 * | 7/2007 | Yamauchi ...................... 700/245 |
| 2010/0131103 A1 * | 5/2010 | Herzog et al. ................. 700/259 |
| 2011/0106339 A1 * | 5/2011 | Phillips et al. ..................... 701/2 |

\* cited by examiner

*Primary Examiner* — Jason Holloway
(74) *Attorney, Agent, or Firm* — Michael L. Greenberg, Esq.; Greenberg & Lieberman, LLC

(57) ABSTRACT

A Global Virtual Presence (SGVP) platform integrates communications, robotics and Men Machine Interface (MMI) technologies and provides a unique way of delivering virtual presence experience to a user. The user can control a Robotic Virtual Explorer Devices (RVEDs) and receive a real-time media stream at his virtual terminal. In addition to real-time interactive video feeds, the system provides a pre-recorded video feed gallery of various most unreachable areas of the world, thereby providing a feeling of virtual-like presence to people, who may never see these places due to physical and financial constraints.

20 Claims, 19 Drawing Sheets

SYSTEM AND METHOD FOR CREATING VIRTUAL PRESENCE

BACKGROUND OF THE INVENTION

1. Field of the Invention

The present invention is related to methods for creating user virtual experiences and, in particular, to a method and system for allowing a user to be virtually present at any place on earth, and beyond.

2. Description of the Related Art

Over the past decade Internet has become an integral part of people everyday lives. Ability to use Internet affects people leisure activities and habits greatly. Modern travelers and vacationers lean more towards individual planning of their trips using Internet. Typically, people perform pre-travel initial information search using variety of on-line resources.

For example, TripAdvisor, a conventional online travel tool, can direct the virtual travelers to areas and places of interest and provide a limited number of photos and videos about these places. A TripAdvisor user, however, has absolutely no control of what photo/video information he can view beyond the pre-recorded video feeds provided on the web site.

Another popular tool is Google™ Streets and Maps products, which allows user to view close up pictures of most urban areas of the world. However, this web tool does not currently cover rural areas, as well as car/boat-inaccessible areas. Likewise, Google™ Streets and Maps product does not give a user any control of what and how the video data is being rendered to him.

Another useful and popular tool is webcams located at points of interest, such as beaches, resorts, ski areas etc. The webcams, typically, provide a user with a limited live (or recorded) view of the area, so the traveler can see current weather, water or snow conditions at the resort. The user once again has no control of what is being shown to him. A view angle and positioning of the web cams is controlled by the company owners and the user has no control over what he can actually see.

Therefore, while all of the above mentioned conventional solutions attempt to provide a user with a live video stream, they do not bring a true virtual experience to user at home, because the user has no control of video feeds being rendered to him on a computer screen. In other words, this type of viewing experience does not step too far away from a conventional TV viewing experience. Currently, the majority of existing video rendering systems, such as TV, WebCasts and radio stations provide limited visual and sound experience based on conventional principles of broadcasting.

Even though the video stream can provide a very wide view, it does not provide a sense of presence, because the user cannot control or interact with the system beyond simple commands "on" and "off." In all conventional systems, a camera man commands and controls the video stream, essentially taking away any freedom of deciding where a user (i.e., a viewer) wants to be at the place of recording of the video stream. A true virtual viewing experience means ability for a user to interact with a video source. None of the existing video streaming systems provide that.

Thus, there is a strong demand for a new type of a low-cost, scalable, commercially available system for providing people with an ability to experience "presence" at any place on the globe and beyond. While many systems that render very interesting high quality video streams exists, none of these systems can claim that they provide a true real-time interactive "virtual presence" to their users and lend them some means for extending the reach of their eyes to remote locations any place on earth and in space and, essentially, let people's dreams come true.

Accordingly, there is a need in the art for a system and method for providing efficient and reliable hands-on interactive virtual experience to people using conventional personal (mobile) communication devices, such as PCs, laptops, iPADs, Smartphones, etc.

SUMMARY OF THE INVENTION

The present invention is related to live video streaming systems. The present invention provides a method, system and computer program for allowing a user to be virtually present at any place on earth and beyond that substantially obviates one or several of the disadvantages of the related art.

In one aspect of the invention, a method for providing a user with a real-time interactive communication using a virtual presence system is facilitated that allows the user to control a visual presence device, which brings back to the user information about places or environments thousands or even tens of thousands miles away. An exemplary embodiment gives a user a freedom and a sense of actual presence by enabling the user to control a presence vantage point in real time.

A Global Virtual Presence (GVP) platform, in accordance with the exemplary embodiment, integrates telecommunication, robotics and Men Machine Interface (MMI) technologies and provides a unique way of delivering virtual presence experience to a user. In addition to real-time interactive video feeds, the system provides a pre-recorded video feed gallery of various most unreachable areas of the world, thereby providing a feeling of virtual-like presence to travelers during their pre-travel preparations, as well as to people, who may never see these places due to physical and financial constraints.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for implementing a Global Virtual Presence (GVP) is provided. The GVP platform, in accordance with the exemplary embodiment, integrates communications, robotics and Men Machine Interface (MMI) technologies and provides a unique way of delivering virtual presence experience to a user in a form of interactive real time user-controlled video feeds.

According to the exemplary embodiment, the GVP platform is connected to a web-based portal. The portal runs a proprietary real-time virtual tour application. A gallery of pre-recorded video feeds can also be viewed via the portal. Additionally, the portal can include various administrative features, such as advertising options, pay-per-view subscription management, account management, sponsorship applications, data analysis applications, video history, etc.

According to the exemplary embodiment, the portal can be implemented on a desktop, TV, tablet, Smartphone or other internet-ready mobile device. Registered users of the GVP system can schedule a real-time virtual tour (i.e., virtual presence experience), review existing video feed from galleries and share their experience through GVP subscriber network. The real-time virtual tour experience is a main purpose of the exemplary embodiment. The real-time virtual tour experience allows users to receive broadcast-level video feeds, and the user can control his "movements" in the virtual remote video space through a sophisticated graphical user interface that controls cameras at remote locations.

According to one exemplary embodiment, end-user commands are buffered and reviewed by an electronic super-user prior to operating a virtual presence termination device. This buffering feature provides a virtual geo-fence to the toured area to insure safety of operations. In other words, a termination device (i.e., a movable robotic device with controllable video cameras) is protected from being directed, for example, into a wall or a rock. The buffering module provides the end-user with rule-based alerts when termination device gets in close proximity to a pre-defined virtual perimeter. Note that Command and Control Protocol directives can be buffered at the RVED or in the RVED CCU.

Figure 1:
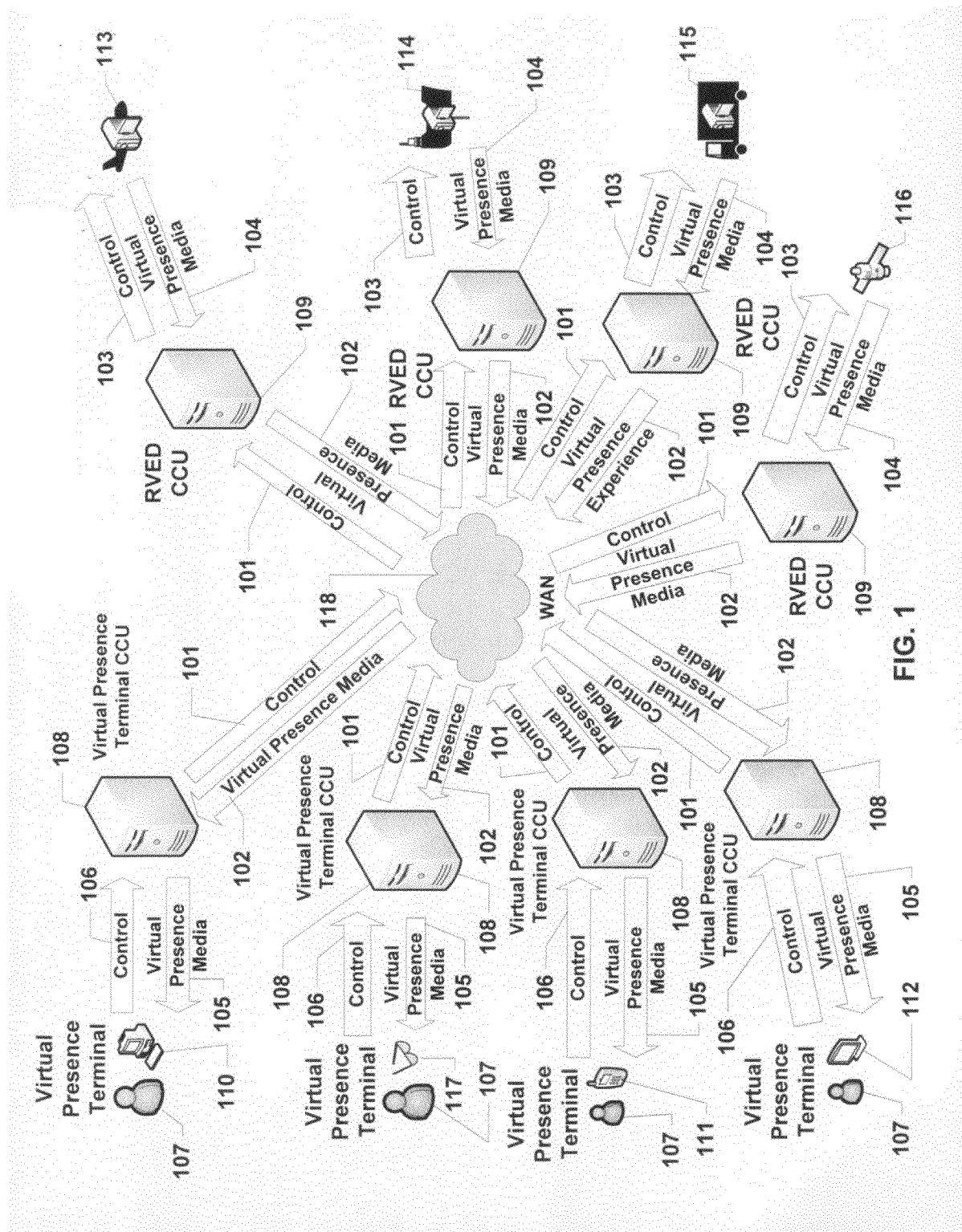
FIG. 1 illustrates a general architecture of the Global Virtual Presence system, in accordance with the exemplary embodiment.

FIG. 1 illustrates architecture of Global Virtual Presence (GVP) system, in accordance with the exemplary embodiment. The GVP includes the following components. Robotic Virtual Explorer Devices (RVED) responsible for video capturing at the remote locations, most unreachable and beautiful places on earth and in space. According to the exemplary embodiments RVED can be implemented as a remotely controlled robotic device of several types.

For example:
Aerial Virtual Explorer (ARVED) 113;
Marine Virtual Explorer (MRVED) 114;
Land Virtual Explorer (LRVED) 115; and
Extraterrestrial Virtual Explorer (ERVED) 116.

According to the exemplary embodiment, the RVEDs have at least one video camera, high resolution video camera or 3D camera installed on them. Note that the RVEDS can have arrays of cameras installed on them for capturing the view area of 360 degrees and providing 3D effects.

The system, in accordance with the exemplary embodiment, includes RVED Command and Control Unit (RVED CCU) 109, responsible for communication, supervising and monitoring the RVEDs and communicating with multiple Virtual Presence Terminal (VPT) CCUs 108. In one exemplary embodiment, the RVED CCU 109 is implemented as a local ground station located in a specific geographic region. In another embodiment, the RVED CCU 109 is implemented as remote server located anywhere in the world.

The Virtual Presence Terminal Command and Control Unit (VPT CCU) 108 is responsible for communication between RVED CCUs 109 and Virtual Presence Terminals (VPTs) 110, 117, 111 and 112. Note that an arbitrary large number of the VPTs can be implemented. The VPT CCU 108 is implemented as super-power server located at an operation center. The VPT CCU 108 includes a sophisticated video feeds database capable of storing large amounts of data. The database uses special indexing and provides high-speed access for user inquiries and playback requests. The VPT CCU database provides matches of specific video files in the database to keywords and/or other search criteria provided by users.

Virtual Presence Terminals (VPTs) 110, 117, 111 and 112 are responsible for the end-user interface. In one exemplary embodiment, the VPT interface is implemented as a set of applications for PC, Smart TV 112 (which has Internet connection and is capable of running Virtual Presence Viewer application), iPad, iPhone and Droid based Smartphones 111. In another exemplary embodiment, the VPT is implemented as Mac or Windows desktop 110 and mobile platforms, as well as Blackberry devices.

Alternatively, the VPT can be implemented on 3D glasses 117 and personal 3D viewer devices, such as virtual reality helmets 117. Note that user data bandwidth from VPTs to the VPT CCU may vary in accordance with user location and subscription options. According to the exemplary embodiment, a user 107 sends commands and control directives to VPT CCU 106 and receives a data stream 105 from the VPT CCU 108, which sends commands and control directives to the RVED CCU 109 over Wide Area Network (WAN) 118 and receives the data stream 102 intended for the user 107 from RVED CCU 109. The RVED CCU 109 sends command and control directives 103 to the RVED 113, 114, 115 and 116 and receives media stream 104 from RVED.

According to the exemplary embodiment, there are two options for passing video feeds. One is as an analog signal over RF link and a second option is sending digitized, compressed data stream from the RVED to the RVED CCU. Formats MPEG4, MPEG2, H.264/AVC or other can be used for video compression. The video can be also encrypted when it is transmitted in digital form from the RVED to the RVED CCU 109 using Data Encryption Standard (DES) or Advance Encryption Standard (AES) depending on a category of the user currently navigating the RVED. Additionally, digital signature can be applied to enhance communications security. The digital signatures can be used, for example, on some (or all frames) of the video stream.

Those skilled in the art will appreciate that the proposed system provides several advantages and benefits. For example:

- The system provides for seamless and easy operation with full effect of remote presence;
- The system provides real-time information movement using high-speed communication methods;
- The system provides flexible deployment methods, because the RVED component is portable and can be quickly transported between various locations minimizing cost and operational expenses;
- The system provides multiple VPT support—concurrently delivers information to multiple end-user terminals;
- The system provides for true Virtual Presence—unique ability to provide users with virtual tours to practically unreachable remote areas on earth and in space;
- The system has high usability employing TV, PC and Mobile applications with full control over RVEDs;
- The system has flexible yet redundant architecture allowing multiple users simultaneous access to one RVED with zero data loss;
- The system provides an automated supervision of user operations using remote buffering of VPT command and control protocol; and
- The system provides an airtight end-to-end security including user rights, audit trail, encrypted data transmission and digital signatures.

Figure 2:
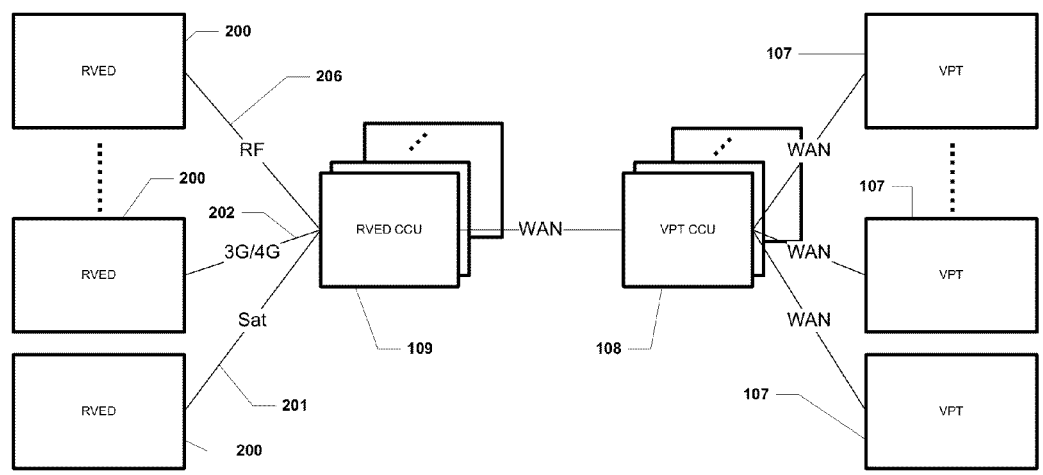
FIG. 2 illustrates a functional diagram of the Global Virtual Presence (GVP) platform, in accordance with the exemplary embodiment.

FIG. 2 illustrates a functional diagram of Global Virtual Presence (GVP) platform, in accordance with the exemplary embodiment. The GVP platform is a combination of telecommunications and robotics that connects people to a variety of remote locations and gives them an unmatched virtual presence experience.

The VPT CCU 108 can receive and send data to multiple VPTs 107. The RVED CCU 109 can communicate with multiple VPT CCUs 108. The RVED 200 can communicate with multiple RVED CCUs 109. The architecture, in accordance to the exemplary embodiment, corresponds to W-X-Y-Z topology, where the RVED 200 is represented by "W", the RVED CCU 109 is represented by "X", the VPT CCU 108 is represented by "Y" and the VPT 107 is represented by "Z".

Each RVED 200 can communicate with any of the RVED CCUs 109, which, in turn, can communicate with any VPT CCUs 108, which, in turn, can communicate with any of the VPTs 107. The mechanism for maintaining the above mentioned topology is implemented in VPT CCU 108. Each RVED 200, RVED CCU 109, VPT CCU 108 and VPT 107 has its own unique identifying number, which is used in routing algorithm to determine data and control flow across the WAN. The platform architecture is based on a clustering approach ensuring end-to-end redundancy and zero data loss. Additionally, every component has a buffering capacity to store and forward information for a short period of time, if communication link is down.

According to the exemplary embodiment, the RVED 200 can be deployed at all of the locations that individuals want to explore anywhere on the globe or in outer space. One RVED 200 can be advantageously shared among multiple users. The RVED 200 is controlled by the on-board computer responsible for fully autonomous (when communication to the RVED CCU becomes impaired) or semi-autonomous (when the RVED receives user's commands and executes Command and Control Directives) navigation functionality. According to one exemplary embodiment, the RVED can be deployed on tourist buses, tourist helicopters or tourist boats and submarines where the navigation of the RVED is predetermined by the navigation route of a tourist company or the owner of RVED navigation route. In this case, a user is not able to control the navigation of the RVED directly, but the user is still able to control the movement of camera or array of cameras installed on the RVED 200. The RVED 200 receives command and control signals from RVED CCU 109 over wireless high-speed communication link, which can be implemented as an RF link 206 or 3G/4G link 202, or a satellite link 201.

The RVED 200 collects the location surrounding environment data including video, sound and environment conditions (i.e., sensory data) collectively providing visual presence information. The RVED 200 transmits this visual presence data to RVED CCU 109 over wireless (e.g., RF, microwave, cellular 3G/4G, or satellite, etc.) communication link.

The RVED CCU 109 communicates with the VPT CCU 108 using bi-directional wide area network-based channel. The VPT CCU 108 communicates with Virtual Presence Terminals 107 (e.g., TV, Personal Computer or Mobile device, such as iPAD or iPhone) through bi-directional wide area network-based channel as well. Thus, the overall communication link provides the end-user with the real-time voice, video and sensory data feed from virtually any desired location in the world. The real-time data feed, in combination with command and control capabilities, creates virtual presence experience for the end-user, while fully redundant architecture and reliable database at VPT CCU site prevents the GVP system from overloading and data loss.

The GVP applies fundamental approach to controlling a vantage point: it allows a user to control a virtual explorer in a form of the RVED—a remote device transmitting remote location surrounding information back to the user in a semi-autonomous, robotically and remotely controlled mode, while adapting itself to user individual navigation requests. Those skilled in the art will appreciate, that, while the GVP platform is relatively simple in its concept, it is extremely powerful due to large variety of technologies that can be integrated on top of it.

Figure 3:
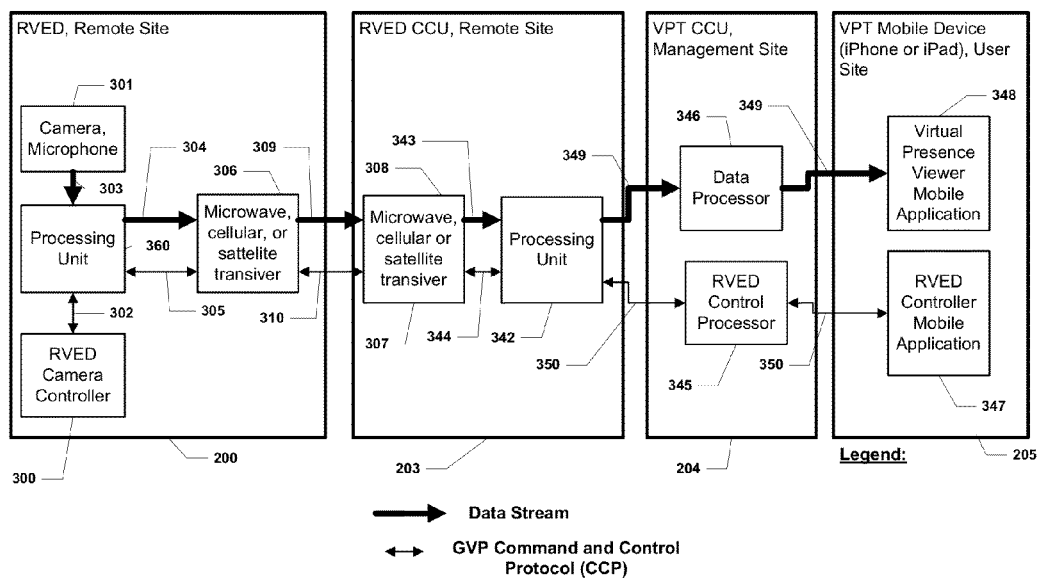
FIG. 3 illustrates a data flow diagram within the GVP system, in accordance with the exemplary embodiment.

FIG. 3 illustrates high-level system architecture and a data flow. A data stream consisting of video, audio and sensory data is transmitted from the RVED 200 to the RVED CCU 203. The RVED CCU 203 sends the data stream to VPT CCU 204 over a Wide Area Network using TCP/IP or UDP/IP protocol. The VPT CCU 204 delivers data stream to the VPT 205, which can run on TV, Personal Computer, iPad/iPhone or Droid mobile device.

The RVED command and control directives are delivered to the RVED 200 from the VPT Command and Control Application (VPT CCA) over the WAN via the VPT CCU 204 and the RVED CCU 203 through using GVP proprietary Command and Control Protocol (GVP CCP). A high resolution camera and a microphone 301 installed inside the RVED 200 deliver video signal to a processing unit 360 over a high speed internal processing bus 303, which sends it to microwave, cellular or satellite transmitter 306.

Microwave, RF, cellular or satellite transceiver (transmitter/receiver) 306 delivers this data to the RVED CCU transceiver 308 over microwave, RF, cellular or satellite link. The data stream is delivered to the RVED CCU processing unit 342, which calculates where to send the data stream and sends it to the VPT CCU data processor 346 over WAN line 349. The VPT CCU data processor 346 sends the data stream to the Virtual Presence Viewer Mobile Application 348 over the WAN line 349.

According to the exemplary embodiment, a user can send the command and control directives to RVED 200 using RVED Controller Mobile application implemented as a component running on Virtual Presence Terminal (e.g., TV, Personal Computer or Mobile device, such as iPAD or iPhone). The RVED Controller Mobile Application 347 sends the command and control directives to the RVED Control Processor 345 and receives back a status of command execution, when the command is executed by the RVED.

If the command is not executed due to a specific reason, the user is notified by an on-screen message containing the reason why the command has failed. The RVED Control Processor sends the command and the control directive to the RVED Processing Unit 342. The RVED Processing Unit 342 sends the command to RVED camera and motion controller 300, which executes the command and sends the command execution status back to the user.

Figure 4:
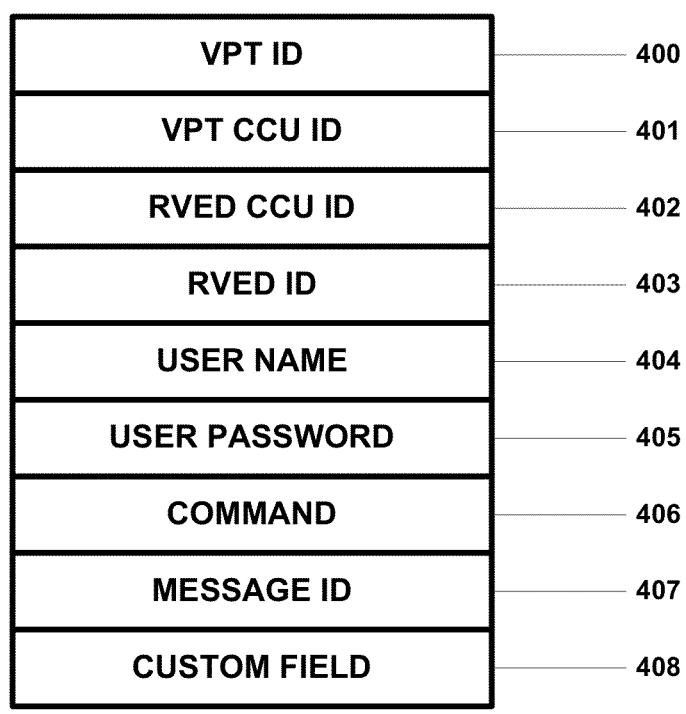
FIG. 4 illustrates a GVP CCP message structure, in accordance with the exemplary embodiment.

FIG. 4 illustrates GVP CCP Message Structure, in accordance with the exemplary embodiment. The GVP sends user command and control commands from VPT to RVED via VPT CCU and RVED CCU by means of Command and Control Protocol (CCP). GVP CCP is realized using XML-based format or a proprietary byte protocol where each data field has a fixed length and definition.

According to the exemplary embodiment, the GVP CCP message structure includes:
  VPT ID—unique VPT identifier 400;
  VPT CCU ID—unique VPT CCU identifier 401;
  RVED CCU ID—unique RVED CCU identifier 402;
  RVED ID—unique RVED identifier 403;
  User name—a name of the user issuing the command 404;
  User password—a password of the user issuing the command 405;
  Command—command and control directive 406. The following CCP directives are defined:
    VPTCCU: File ID, Store;
    VPTCCU: File ID, Retrieve;
    VPTCCU: Keyword, Search;
    RVED.move: Up;
    RVED.move: Down;
    RVED.move: Rotate clockwise;
    RVED.move: Rotate counterclockwise;
    RVED.move: Move forward;
    RVED.move: Move backward;
    RVED.move: Accelerate;
    RVED.move: Decelerate;
    RVED.move: Stop;
    RVED.move: Return To Base;
    RVED.Camera: Camera ID, Up;
    RVED.Camera: Camera ID, Down;
    RVED,Camera: Camera ID, Left;
    RVED.Camera: Camera ID, Right;
    RVED.Camera: Camera ID, Zoom in;
    RVED.Camera: Camera ID, Zoom out;
    Diagnostic: Run;
    Diagnostic: Send Diagnostic Report;
    Routing: Request ID;
  Message ID 407;
  Custom Field 408—this field is used to send any custom information. In one embodiment, the Custom Filed can be used as user subscription class: Silver/Gold membership.

Figure 5:
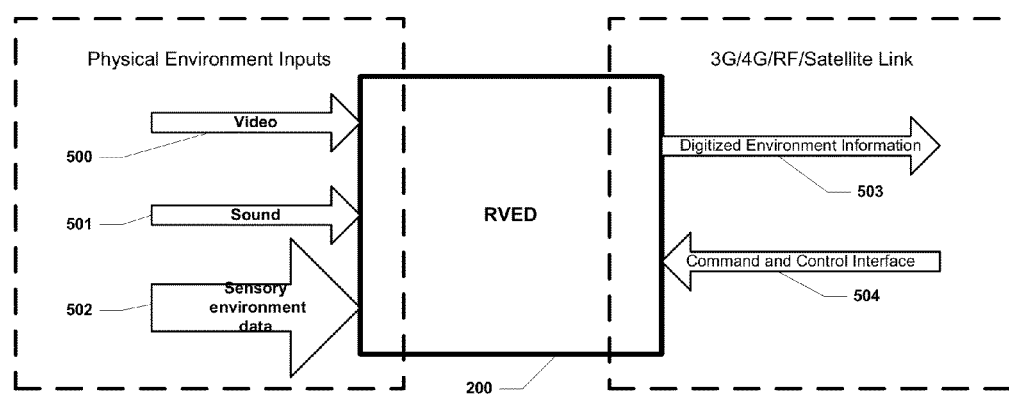
FIG. 5 illustrates RVED interface, in accordance with the exemplary embodiment.

FIG. 5 illustrates RVED interface architecture, in accordance with the exemplary embodiment. The RVED is a front-end device of the GVP system responsible for access to the remote target area or location. RVED functionality includes visual capability, sound capability and sensory capabilities (e.g., a smell, temperature, humidity, an air pressure, etc.). The RVED is a robotic system capable of moving at remote site according to commands issued by a user at a remote terminal located in another part of the world.

One of the main features of the RVED is its ability to validate and analyze command and control directives coming from remote users and interpolate them by its autonomous navigation controller, thus preventing itself from collisions with the surrounding objects upon receiving command that is considered risky or unattainable by the RVED navigation unit.

According to the exemplary embodiment, the RVED is capable of receiving command and control signals from the RVED CCU and transmitting environment-related information to the RVED CCU for processing. The RVED regardless of its type has the same functional and technical characteristics:
  Ability to capture and digitize the following data:
  Video;
  Audio;
  Other environment characteristics necessary for reconstruction of the remote environment where RVED is located;
  Autonomous operations;
  Semi-autonomous operations;
  Real-time dynamic planning of movement;
  Automated navigation—map control including waypoints navigation;
  Automated collision prevention; and
  Automated return to base operations, in cases of communication failures or reaching of a point of no return.

The RVED is capable of capturing and digitizing environment data and transmitting it over to RVED CCU. The RVED is capable of moving along a user-defined path corrected (delineated) by a navigation criteria and a set of pre-defined rules. Thus, the RVED adapts itself to surrounding environment. The RVED is capable of combining user navigation commands and automated movement calculations allowing the user to experience a virtual presence effect. The RVED is able to re-calibrate the automated navigation control upon receiving new command from the user. The RVED is able to follow autonomously the predefined navigation path including waypoints. The RVED is able to avoid collisions with objects along its navigation path including moving around obstacles autonomously and automatically. The RVED is able to follow the autonomously calculated path to the base station when communication channel is not available or the distance from the base exceeds allowed distance. The RVED is capable of an automatic replacement of battery by identifying low battery level, returning to the base, recharging and getting back into the environment (e.g., air, water, surface, etc.)

The RVED 200 physical inputs are video 500, sound 501 and other remote environment sensory information 502 (e.g., temperature, humidity, pressure, wind direction and speed, etc.). The RVED 200 also receives command and control input signals from RVED CCU 504. The RVED 200 output signals 503 are digital or analog video, digital or analog audio 501, and digital command and control interface execution status codes.

The RVED 200 has a navigation processor responsible for analysis, validation and generation of navigation commands based on sensory data (GPS coordinates, distance to obstacles, temperature, humidity, pressure and etc.). The navigation processor is also responsible for analysis and validation of navigation commands received from a user via SGVP CCP and overlaying them over autonomous navigation instructions.

The RVED 200 includes a Camera Control Processor. This component receives and executes commands addressed to RVED cameras. The RVED 200 also includes an Encryption Processor. This component encrypts video, audio and sensory data streams going from RVED 200 to RVED CCU 109 over high-speed wireless digital link. Various algorithms such as DES and RSA can be used for the encryption.

The RVED 200 has a built-in Global Positioning System (GPS) processor. This component is responsible for finding RVED position in space based on the GPS signal. The RVED 200 includes a Sensor Control Processor. This component is responsible for collecting data from the RVED sensors and pre-processing the data, if necessary. The RVED 200 has its own Communication Processor. This component is responsible for managing high-speed wireless digital link between the RVED and the RVED CCU.

RVED Control Processor is responsible for processing RVED control commands and sending them to Navigation processor for further processing. An Encoder/Compressor encodes video, audio and sensory data into a digital compressed signal. Algorithms such as MPEG4, MPEG2 or H.264/AVC can be used for video and audio encoding in case of digital transmission of video and audio from the RVED to the RVED CCU.

A Health Monitoring Processor runs RVED self-diagnostics and reports results to the RVED CCU and consequently to the VPT CCU, which makes determination of whether the RVED CCU is safe to operate based on the status of the self diagnostics. This component is also responsible for managing battery level and automatic battery replacement process.

Figure 6:
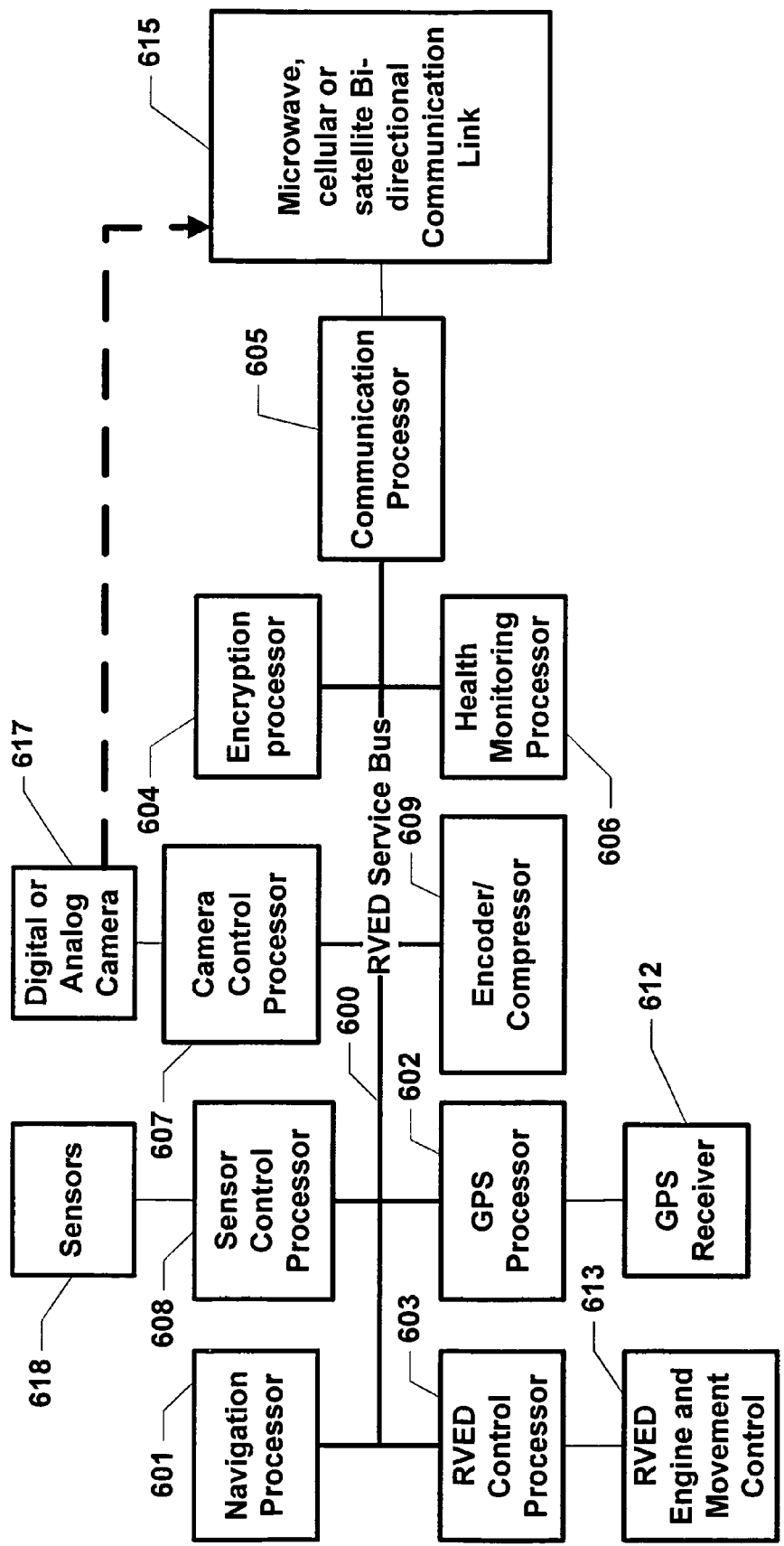
FIG. 6 illustrates RVED Service Bus infrastructure, in accordance with the exemplary embodiment.

FIG. 6 illustrates RVED service bus, in accordance with the exemplary embodiment. Sensor Control Processor 608 collects data from all mechanical and electrical sensors that are exposed to RVED external physical environment. A signal coming from sensors can be analog or digital. Sensor Control Processor 608 can encode the analog signals and transform them into GVP format. If the signal coming from sensor is digital then no signal transformation is performed, and sensory data is encoded into GVP format (a proprietary protocol for digital sensory data transmission).

Camera Control processor 607 communicates with on-board digital or analog camera 617. Note that an arbitrary number of cameras provides 360 degrees view and can be either 2D or 3D depending on the RVED configuration. In case of analog camera, the analog video and audio signal are sent directly to Wireless (RF, microwave, cellular or satellite) Bi-directional Communication Link. In case of digital camera, the digitized video and audio (if available) signals are sent to the Camera Control Processor 607. The Camera Control Processor 607 also controls the digital cameras.

GPS Processor 602 communicates with GPS and receives GPS information from GPS receiver 612, which is used by the RVED Control Processor 603. The GPS information is also sent to the end user via Communication Processor 605. RVED Control Processor 603 communicates with all RVED mechanical parts responsible for RVED movement called RVED Engine and movement control 613.

The Communication Processor 605 communicates with the Wireless Bi-directional Communication Link 615. The Communication Processor 605 receives command and control directives from the Communication Link 615 and sends it to one or more components on RVED Service Bus (RSB) 600. The Communication Processor 605 also sends digitized video, audio, sensory data and command execution status to the Communication Link 615, which communicates with the RVED CCU.

Figure 7A:
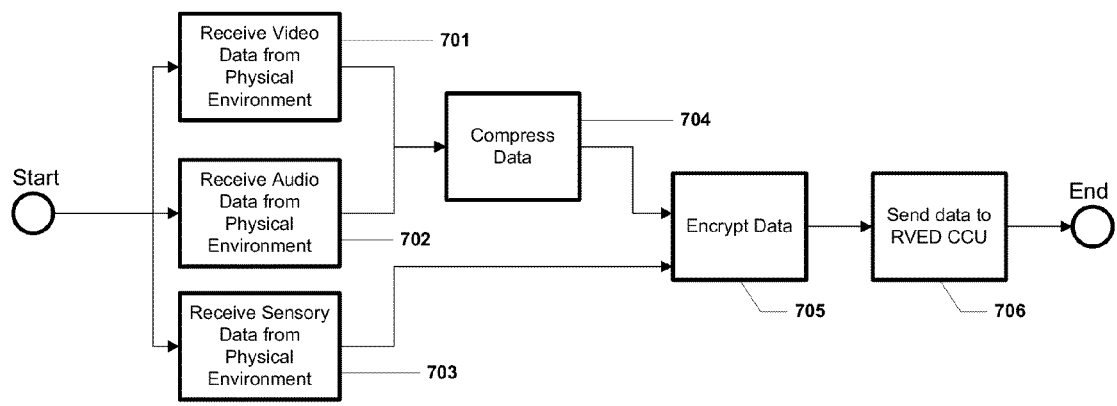
FIG. 7A illustrates RVED transmitting data flow, in accordance with the exemplary embodiment.

FIG. 7A illustrates RVED transmitting data flow in accordance with the exemplary embodiment. FIG. 7A shows the data flow when the RVED receives video 701, audio 702 and sensory data 703 and transmits it to the VPT via the RVED CCU and the VPT CCU. The RVED receives video and audio from physical environment via high quality, high definition commercially available cameras, compresses it using standard compressing algorithms (such as MPEG4) 704, encrypts 705 and sends to RVED CCU 706 together with encrypted sensory data via high speed digital wireless link.

Figure 7B:
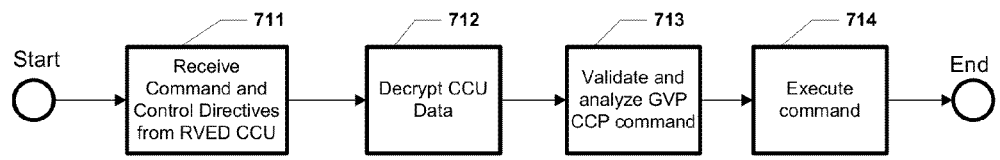
FIG. 7B illustrates RVED receiving data flow, in accordance with the exemplary embodiment.

FIG. 7B illustrates RVED receiving data flow in accordance with the exemplary embodiment. FIG. 7B shows the data flow when the RVED receives GVP CCP directives from the RVED CCU. The RVED receives user commands through high-speed wireless communication link from RVED CCU 711. The RVED CCU data is encrypted, so upon receiving the command, the command data is decrypted by RVED on-board computer 712. The command data is then analyzed and validated by RVED navigation controller 713 and, if the command is valid, the RVED navigation controller executes the command 714.

Figure 8:
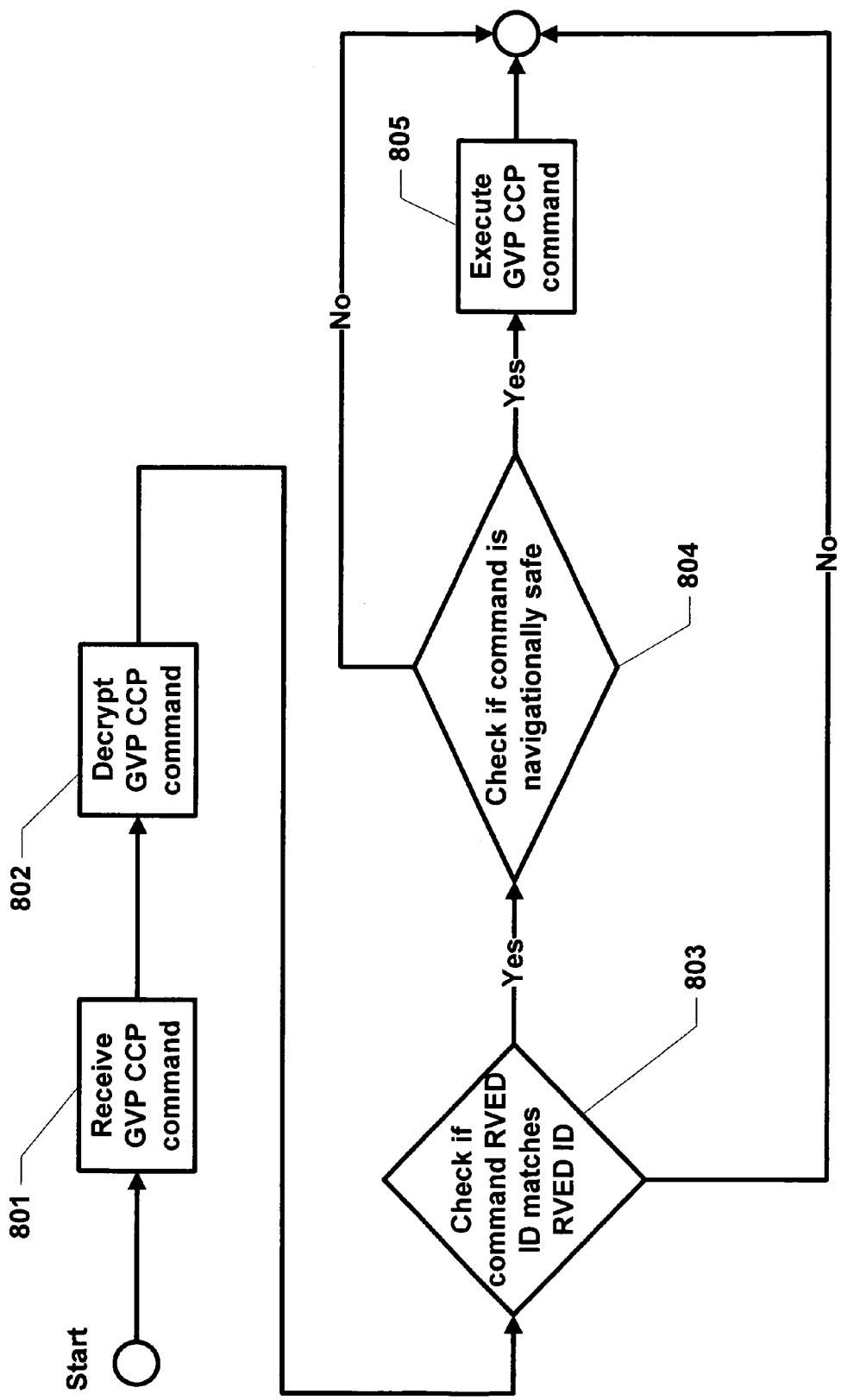
FIG. 8 illustrates RVED GVP CCP command processing, in accordance with the exemplary embodiment.

FIG. 8 illustrates RVED GVP CCP Command Processing, in accordance with the exemplary embodiment. FIG. 8 shows the processing of the GVP CCP command. The RVED receives the GVP CCP command in step 801 and decrypts it in step 802. At the next step 803, the RVED ID that is received from the command is matched with RVED ID. If ID matches, the command is sent to the RVED Navigation Processor 601 (see FIG. 6) where, in step 804, the command is checked against current navigation plan. If the command is safe and will not cause detrimental effect to the RVED movement, the command is executed the by RVED Control processor in step 805.

Figure 9:
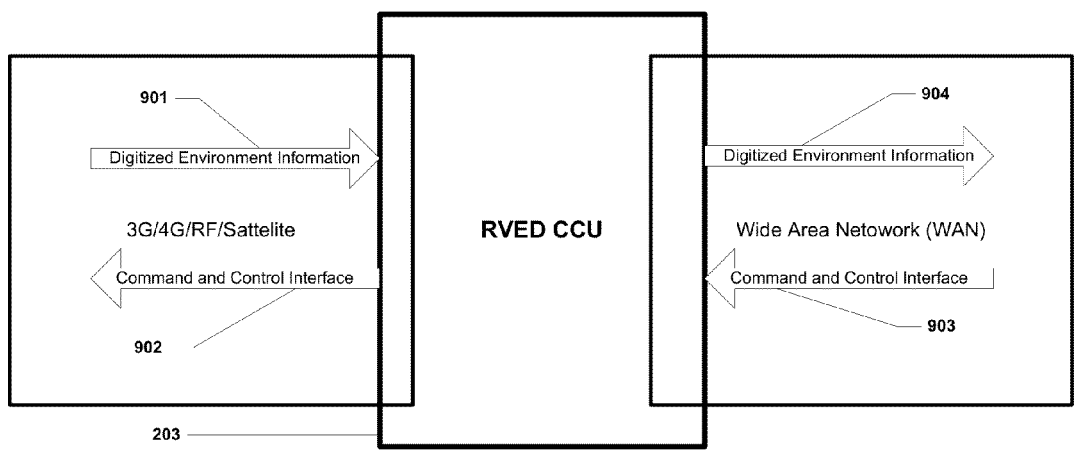
FIG. 9 illustrates RVED CCU interface architecture, in accordance with the exemplary embodiment.

FIG. 9 illustrates RVED CCU high level interface architecture, in accordance with the exemplary embodiment. The RVED CCU 203 is fully autonomous, computer-based sub-system that is operated remotely and does not require human intervention for relaying command and control directive from users. The RVED CCU 203 provides fully autonomous navigation and control of the RVED. The RVED CCU 203 can incorporate functionality for performing automatic RVED maintenance functions, such as battery change, defective rotor change, calibration of RVED sensors, etc.

According to the exemplary embodiment, the RVED CCU 203 is responsible for:
  receiving of the digitized 901 data from the RVEDs;
  transmitting the digitized data 904 to the Virtual Presence Terminal Command and Control Unit (VPT CCU);
  receiving the command and control data 803 from the VPT CCU;
  transmitting the command and control data 804 to the RVEDs; and
  video compression.

Figure 10:
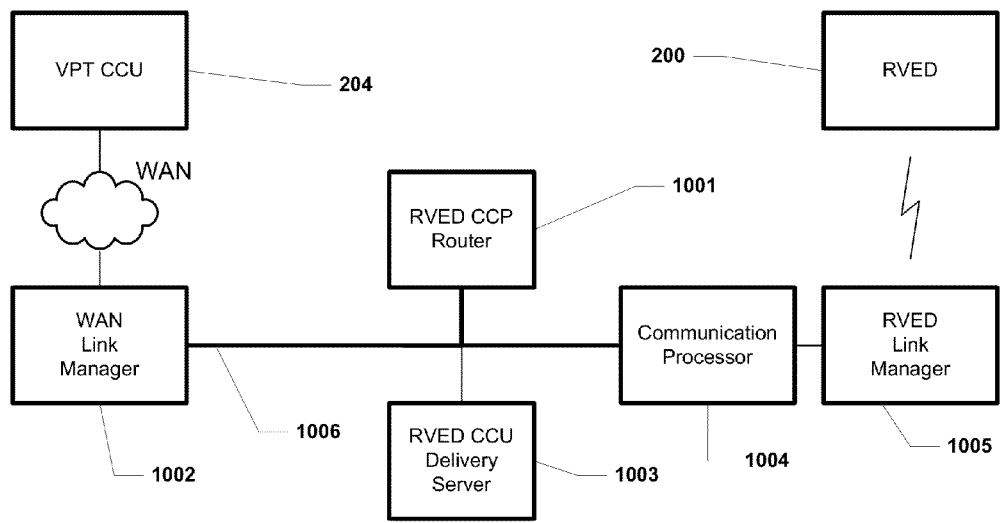
FIG. 10 illustrates RVED CCU architecture, in accordance with the exemplary embodiment.

FIG. 10 illustrates RVED CCU high level architecture, in accordance with the exemplary embodiment. The RVED CCU includes the following functional components:

- a WAN Link Manager 1002. This component is responsible for receiving GVP CCP directives and transmitting it to the RVEDs 200 in accordance with GVP RVED routing over RVED CCU Service BUS 1006. The WAN Link Manager 1002 is also responsible for receiving a data stream from RVED CCU Delivery Server 1003 and delivering it to VPT CCU through WAN;
- RVED Link Manager 1005. This component is responsible for communication with the RVEDs 200. The RVED Link Manager 1005 transmits the GVP CCP directives to the RVED 200 and receives an encrypted data stream from the RVED 200;
- RVED CCP Router 1001. This component is responsible for selecting the RVED 200 for transmit the GVP CCP directives and for receiving back the video/audio/sensory data stream. Upon receiving request from the VPT CCU 204 to acquire the RVED 200 for the VPE session, the RVED CCP router 1001 directs the RVED CCU Streaming Server to stream video/audio/sensory data to the VPT CCU 204 identified by the VED CCP router 1001.
- RVED CCU Delivery Server 1003. This component is responsible for information delivery management. The RVED CCU Delivery Server 1003 performs streaming delivery, in case of green light from the Link Manager or stores the captured data and forwards it to the VPT CCU 204 upon reception of green light again. Note that the RVED CCU 203 buffering functionality is one of the GVP's unique features that ensure zero data loss in case of communication link failure.

According to the exemplary embodiment, The VPT CCU is responsible for:

- Receiving digitized information from RVED CCU;
- Transmitting digitized information to multiple Virtual Presence Terminals (VPTs);
- Receiving command and control information from VPTs;
- Transmitting command and control information to RVEDs CCU;
- Routing digitized environment information and command and control information between multiple RVEDs and VPTs;
- Storing all pertinent information into permanent storage for future retrieval including virtual presence information and user account information;
- Providing means for converting digitized information into virtual presence information;
- Augmenting virtual presence information with location information and other indicator information;
- Creating an environment for allowing simulation of controlled RVED movement.

According to the exemplary embodiment, VPT CCU includes the following components:

A Network Processor is a hardware/software component responsible for network communication with RVED CCUs and VPTs;

A Database Manager is a hardware/software component responsible for storage of user information, user VPE session information, VPTs information, RVEDs information, RVED CCUs information, RVEDs information, video/audio/sensory received from users and CCU information received from users. The database includes high-availability cluster architecture preventing system from data loss;

A Service Bus is a hardware/software component responsible for communication between all VPT CCU components;

VPE Streaming Server is a hardware/software component responsible for retrieval and streaming of VPE (Virtual Presence Experience media) or pre-recorded session data to the VPTs;

An Overlay Processor is a hardware/software component responsible for overlaying command and control interface and sensory information over a video stream;

A Request Router is a hardware/software component responsible for routing user requests from the VPTs to selected RVEDs and routing video/audio/sensory streams from the RVEDs to the VPTs;

A File System is a hardware/software component responsible for storing archived RVEDs and VPEs session information;

A Web Application Server is a hardware/software components servicing user requests when user logs into the GVP through a WEB-based user interface;

A Protocol Mediator is a hardware/software component responsible for protocol conversion, if video/audio/sensory data streaming and CCU protocols are different for different RVEDs;

A Video Processor is a hardware/software component performing video-related operations such as video decompression, video overlaying, video augmenting and video analysis;

A Performance Optimizer is a hardware/software component responsible for analyzing video/audio/sensory streams and adjusting RVED's transmission rate to optimize video/audio quality or adjusting video bandwidth in accordance with a user type;

An Augmented Reality Processor is a hardware/software component responsible for creating user friendly video overlay prompts, which provide user with information about the objects currently being observed by the RVED. For example, if a user is pointing a camera at Coliseum in Rome, the Augmented Reality Processor (in augmented reality mode enabled) will display some brief historical facts about the building—when it is built, who is an architect and how tall and how wide is the building and etc. If a user points a camera at Elephant in African safari, the Augmented Reality Processor provides relevant data such as what group the given animal belongs to, male or female, and other information about the animal;

A Video Search Processor is a hardware/software component responsible for efficient search and retrieval of pre-recorded Virtual Presence Experience session data;

Neural Network Processor is a hardware/software component responsible for analysis of user usage patterns and statistics and suggesting appropriate user connections in the GVP user community. It can also provide information to the Video Search Processor for efficient retrieval of video that might be of interest to a specific user. The Neural Network Processor manages users' relationships and a social network based on the neural network architecture;

A Security Processor is a hardware/software component responsible for encoding and decoding video and audio streams, user data, GVP CCP directives and execution codes.

Figure 11:
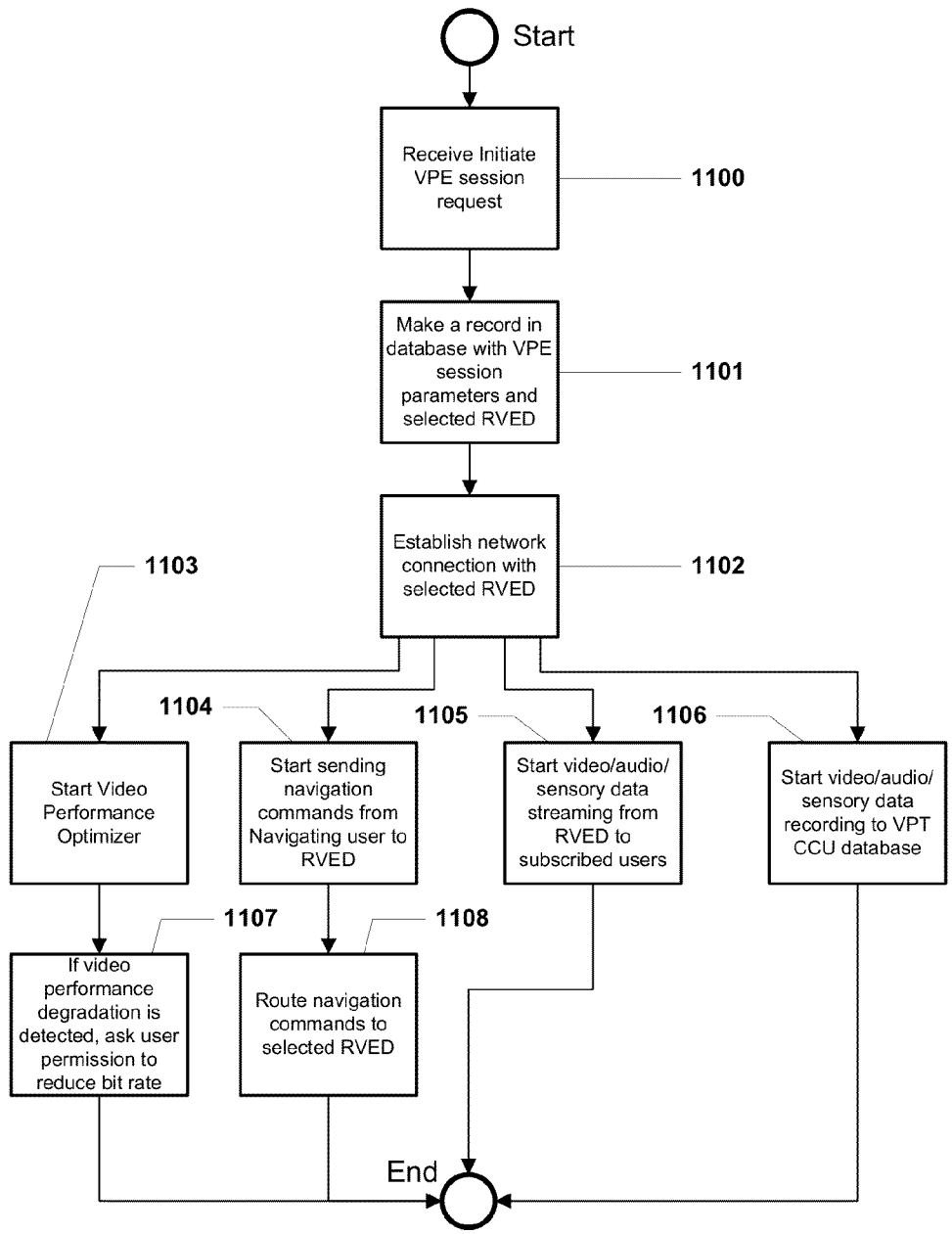
FIG. 11 illustrates a flow of operations when a user starts VPE session with a selected RVED.

FIG. 11 illustrates flow of operations when a user starts VPE session with a selected RVED. When a user wants to see a remote place on the globe (or in space), he initiates a VPE session 1100. The request is recorded, in step 1101, into VPT CCU database with corresponding VPT parameters and a selected RVED.

The VPT CCU finds the routing path to the selected RVED using GVP routing algorithm and establishes network connection with selected RVED via GVP CCP in step 1102. The selected RVED, in step 1105, starts video streaming to the VPT with user VPE session trough the RVED CCU and the VPT CCU. The VPT CCU also starts recording of video/audio/sensory data into VPT CCU database and a file system to preserve data received from the RVED for future retrieval (step 1106).

The VPT CCU also starts video performance optimization processor which detects bandwidth degradation, in step 1103, and reduces the data streaming bit rate after receiving user permission for doing so in step 1107. The VPT CCU also starts sending navigation commands to RVED, in step 1104 through VPT routing protocol in step 1108.

Figure 12:
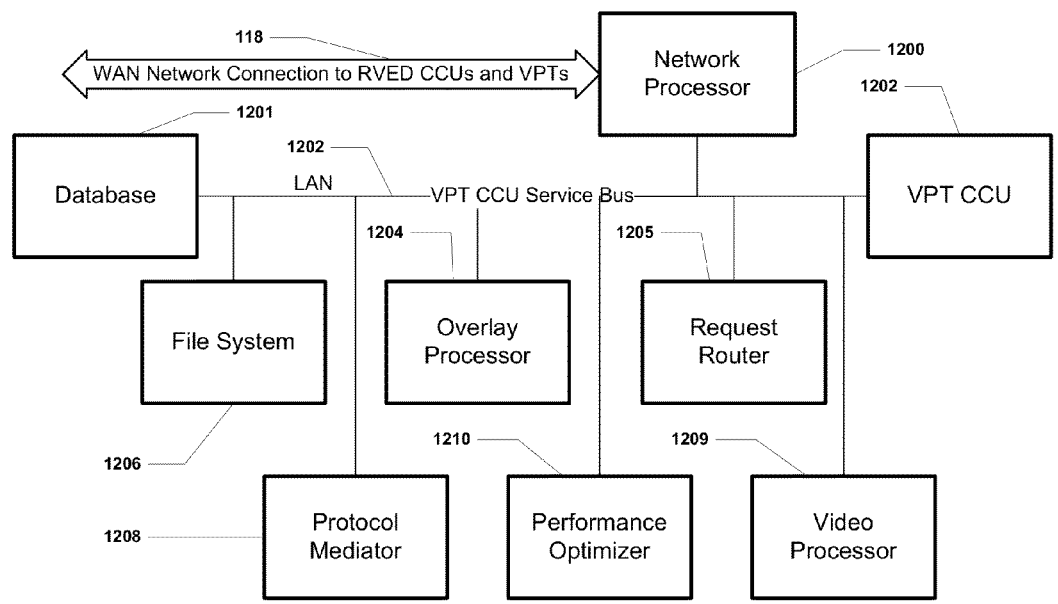
FIG. 12 illustrates VPT CCU Service Bus infrastructure, in accordance with the exemplary embodiment.

FIG. 12 illustrates a high level communication mechanism for sending command and data between VPT CCU components. Every VPT CCU component is connected to a high-speed service bus, which delivers information from one subsystem to another without need to establish point-to-point communication. VPT CCU service bus sends messages between subsystems using specific message structure consisting of a header, a command, an address of a sending system, an address of a receiving system and a message header encapsulating data intended to be transmitted between components.

Network Processor 1200 receives video stream from the RVED CCUs and Command and Control Protocol directives from the VPTs. The Request Router 1205 re-routes the video stream to specific VPT depending on the VPT CCU routing tables stored in Database 1201. Every component in the VTP CCU connected to VPT CCU Service Bus is uniquely identified using end point Uniform Resource Identifier URI stored in the VPT CCU Database 1201.

Figure 13:
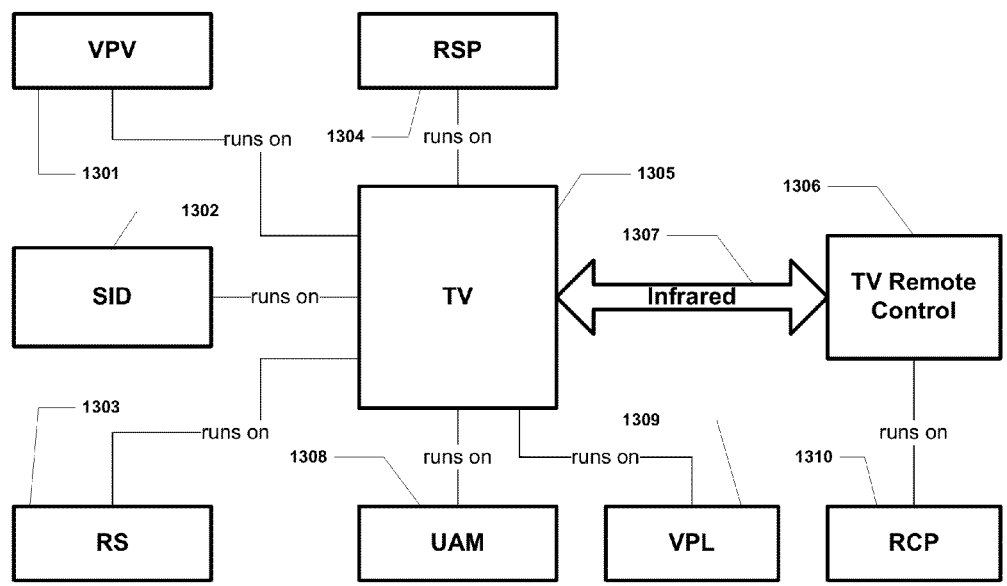
FIG. 13 illustrates VPT-TV allocation of hardware devices, in accordance with the exemplary embodiment.

FIG. 13 illustrates VPT-TV allocation of hardware devices. According to the exemplary embodiment, the Virtual Presence Terminal is a back-end device of the system responsible for the Man-Machine Interface (MMI) to the end-user. This component provides functionality for users to be immersed into virtual presence experience.

In one embodiment it can be as simple as software-based viewer running on a user workstation. In another embodiment it can be implemented as a 3D TV viewer, a specialized 3D viewing system, a virtual presence helmets or an entire room displaying a holographic image of remote location rendered in real time using images passed to VPTs by VPT CCU from virtual explorers filming at remote locations.

According to the exemplary embodiment, each VPT has the following functional components:
- A Virtual Presence Viewer VPV 1301 for video and audio streams coming from the RVEDs;
- A Sensory Information Display (SID) 1302, which allows user to monitor sensory information coming from the RVEDs. The SID can be overlaid or embedded into the VPV;
- RVED Control Panel (RCP) 1310, which allows a user to remotely control any of the selected RVEDs;
- RVED Selector Panel (RSP) 1304, which allows a user to select the RVED to use for Virtual Presence emerging experience;
- User Account Management (UAM) 1308, which allows a user to change a class of service, manage social network settings and monitor every action performed within the GVP, as well as perform financial transactions;
- Virtual Presence Library (VPL) 1309, which allows a user to monitor and repeat his/her or publically shared Virtual Presence Experience (VPE);
- RVED Simulator (RS) 1303, which allows a user to experience Virtual Presence Experience (VPE) in simulated environment and improve his/her skills of navigating the RVED.

The Virtual Presence Viewer 1301 is a software component capable of receiving and rendering a video and audio stream. The VPV 1301 has the following functional characteristics:
- Zoom, allowing the user to increase or decrease image size;
- Video mode selection (manual), allowing user to select image quality depending on network throughput and bandwidth;
- Video mode selection (automatic/adaptive). Depending on throughput and bandwidth of communication channel and quality of video equipment installed on the RVED, the GVP adaptively and automatically calculate the optimal image resolution for video mode selection available on a given display device;
- 3D capability. Depending on availability of 3D video stream from the RVED, the VPV will display video and audio streams in a 3D representation.

Sensory Information Display (SID) 1302 is a software component, which allows to display sensory information received from the RVEDs. Sensory information includes but not limited to the following environment parameters:
- Physical RVED coordinates (latitude and longitude);
- Altitude above/below the sea level;
- Temperature;
- Pressure;
- Local time.

The SID 1302 can be overlaid over a video image or displayed side by side with the video stream coming from the RVED.

The RVED Control Panel (RCP) 1310 is a software component allowing a user to send command and control directives to the RVED. Upon receiving user directive, the RVED analyzes the incoming command and makes necessary determination if the command can be executed without interference or it needs to be adjusted due to safety or other-constraints.

On VPT-TV RCP directives are communicated to the RVED through use of standard TV remote control number keypad. The RCP actions are also displayed on TV set using overlay technologies. The user commands for RVED are programmed as following:
- Turn left—turn RVED left or in counterclockwise direction;
- Move forward—move RVED forward;
- Turn right—turn RVED right or in clockwise direction;
- Move left—move RVED left;
- Move back—move RVED back;
- Move right—move RVED right;
- Accelerate—accelerate RVED in a direction chosen by the above commands;
- Move up (where applicable);
- Decelerate—decelerate RVED;
- Move down (where applicable).

These commands allow for complete 360 degrees, horizontal and vertical movement of RVED allowing for full 3D navigation. By issuing series of commands described above, a user can navigate RVED to any point within allowed RVED navigation perimeter space. Selecting a command button and holding it down accelerates the movement in a chosen direction.

RVED Selector Panel (RSP) 1304 is a software component allowing user to select RVED, which he/she wants to use, and from which to receive video, audio and sensory information. RSP 1304 is displayed on TV as a selectable list of RVEDs that a user have already being communicating to. If the list is empty, then a user is allowed to perform RVED search by the following parameters:

By geographic region (Planet, Continent, Country, Area, City);

By geographic coordinates;

By RVED name. This is a unique name, which can be assigned to the RVED by a user after the search is completed. Every operation that the user performs with the RVED is stored by the VTP CCU and associated with RVED's name assigned by the user. If the user does not assign a unique name to the RVED, the user will need to repeat the search every time by region or coordinates;

By favorites list. The user can create a list of favorite RVEDs, which are displayed after a name of the favorite list is entered; and By initiating one or joining already planned group expedition with the specific RVED. For more advanced search mechanism, the user can go to RVED Global Map screen, which allows navigation of space and zooming into specific region of space—planet, continent, country, area and city.

Figure 14:
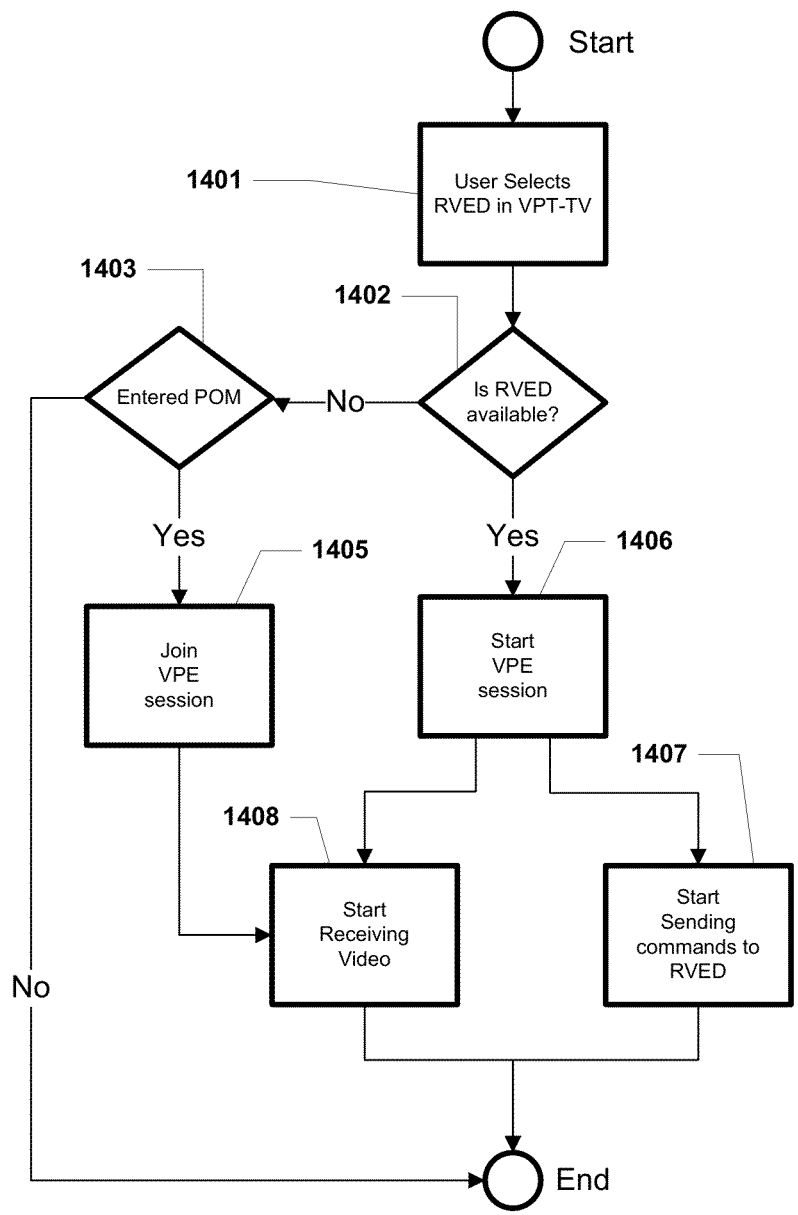
FIG. 14 illustrates a flow of operation when a user selects the RVED.

FIG. 14 illustrates a flow of operation when a user selects the RVED. A user of the GVP searches for the RVED on the search screen using RVED Selection Panel of VPT-TV. Once the RVED is found, it can be selected by the user in step 1401. Once selection is made and "Enter" is pressed, the VPT-TV displays the availability schedule for selected RVED in step 1402.

If the RVED is currently available, the user can start operating the RVED by pressing a button on TV remote (step 1406). If the RVED is not currently available and is operated by another user, the user can book the RVED for operation in the future date/time. If the RVED is operated by one of user's friends, the user can choose to request the RVED in Passenger Operation Mode (POM) in step 1403 and join the VPE session in step 1405.

Note that while in POM, the user is not allowed to send navigation directives to the RVED, but instead he is passively observes what his friend does. The user receives the same video, audio and sensory information that his friend does, but is not allowed to navigate the RVED. However, the user may ask his friend to hand him over the RVED control.

The user can search for other users by their screen names. Once the user finds the screen name of another user he likes, he can request a friend status from that user. Once the friend status is granted, the POM can be granted as well. While in POM, the user is able to see commands issued by his navigating friend. These commands are displayed in overlaid region on top of a video image. If the user navigates the RVED, he can send commands to RVED in step 1407 and also receive video, audio and sensory data streams in step 1408. Note that, while in POM mode, the user is only capable of receiving video, audio and sensory data streams, but he cannot issue commands to the RVED.

According to the exemplary embodiment, if the TV screen is used, the user can use a TV Remote Control in order to control the RVED. For Mobile Device screen, the user can employ "Touch Screen" functionality or a keyboard to control the RVED. In case of Personal Computer Monitor, the user can use keyboard or mouse to control the RVED. For Personal Viewing Device (e.g. glasses or helmet), the user can employ voice commands or on screen controls in order to control the RVED.

Figure 15:
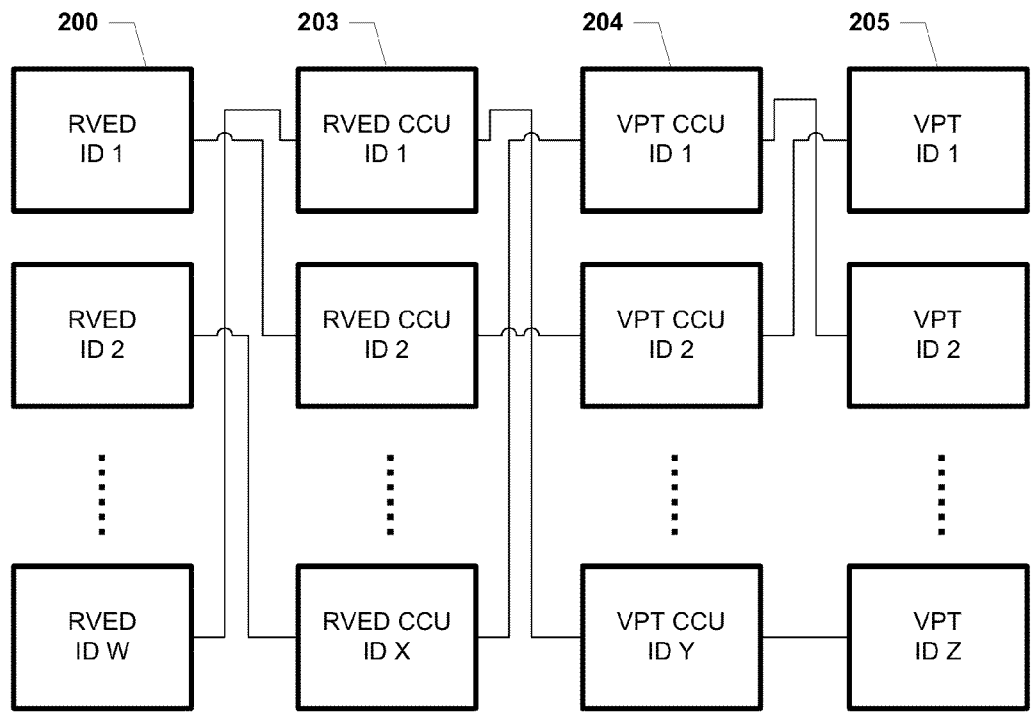
FIG. 15 illustrates GVP Routing Algorithm, in accordance with the exemplary embodiment.

FIG. 15 illustrates GVP Routing Algorithm, in accordance with the exemplary embodiment. FIG. 15 shows the components participating in the GVP Routing Protocol (GVP RP). Any RVED networked to GVP (W) 200, can communicate with any RVED CCU (X) 203, which can communicate with any VPT CCU (Y) 204, which can communicate with any VPT (Z) 205, thus creating W*X*Y*Z number of routing paths from the RVED to the VPT.

Once the routing path is established, all data from RVED W is sent to VPT Z through RVED CCU X and VPT CCU Y. The GVP CCP directives are sent from VPT Z to RVED W via the same route. Any RVED can communicate with only one RVED CCU at a time, but one RVED CCU can communicate with multiple RVEDs. Any VPT can communicate with only one VPT CCU at a time, but one VPT CCU can communicate with multiple VPTs.

Figure 16:
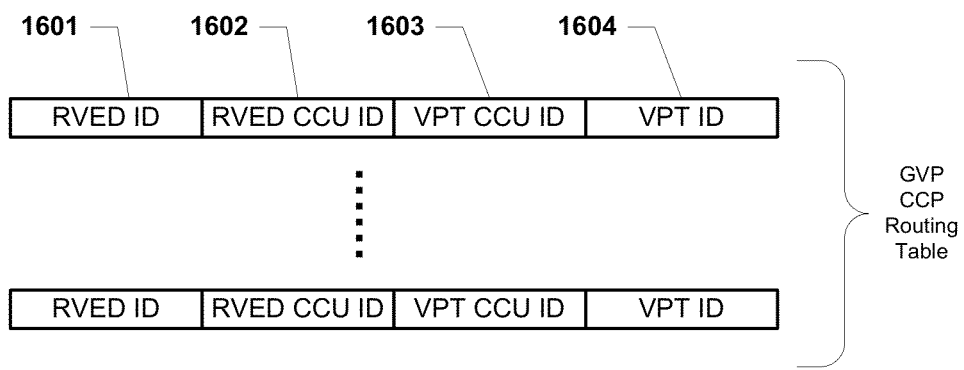
FIG. 16 illustrates an exemplary GVP CCP routing table.

FIG. 16 illustrates GVP CCP routing table. FIG. 16 shows how the W-X-Y-Z configuration of RVED-RVED CCU-VPT CCU—VPT is achieved. All device IDs—RVED ID 1601, RVED CCU ID 1602, VPT CCU ID 1603 and VPT ID 1604 are unique. These IDs are stored in GVP Routing Protocol (RP) table. This table is stored in the RVED CCU and the VPT CCU, thereby providing ability for the RVED CCU and the VPT CCU to route the data stream and control data to appropriate destinations. Once device configuration is changed, the above described tables are updated dynamically to reflect a real-time GVP device configuration snapshot.

Figure 17:
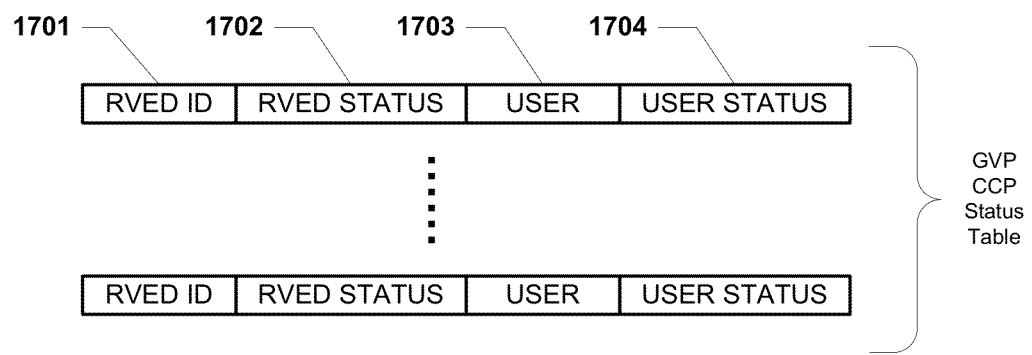
FIG. 17 illustrates an exemplary GVP CCP user status table.

FIG. 17 illustrates GVP CCP status table. FIG. 17 demonstrates how the information about the users and RVEDs is stored. At any given time, any RVED that is in use 1701 has a user 1703 controlling it in a navigation mode or POM mode, and this status is recorded in the status table in real time. The RVED status 1702 can be any of:

Active;

Not available; and

Out of Service.

The user status 1704 can be any of:

Navigator Mode (NM); and

Passenger Operating Mode (POM).

Figure 18:
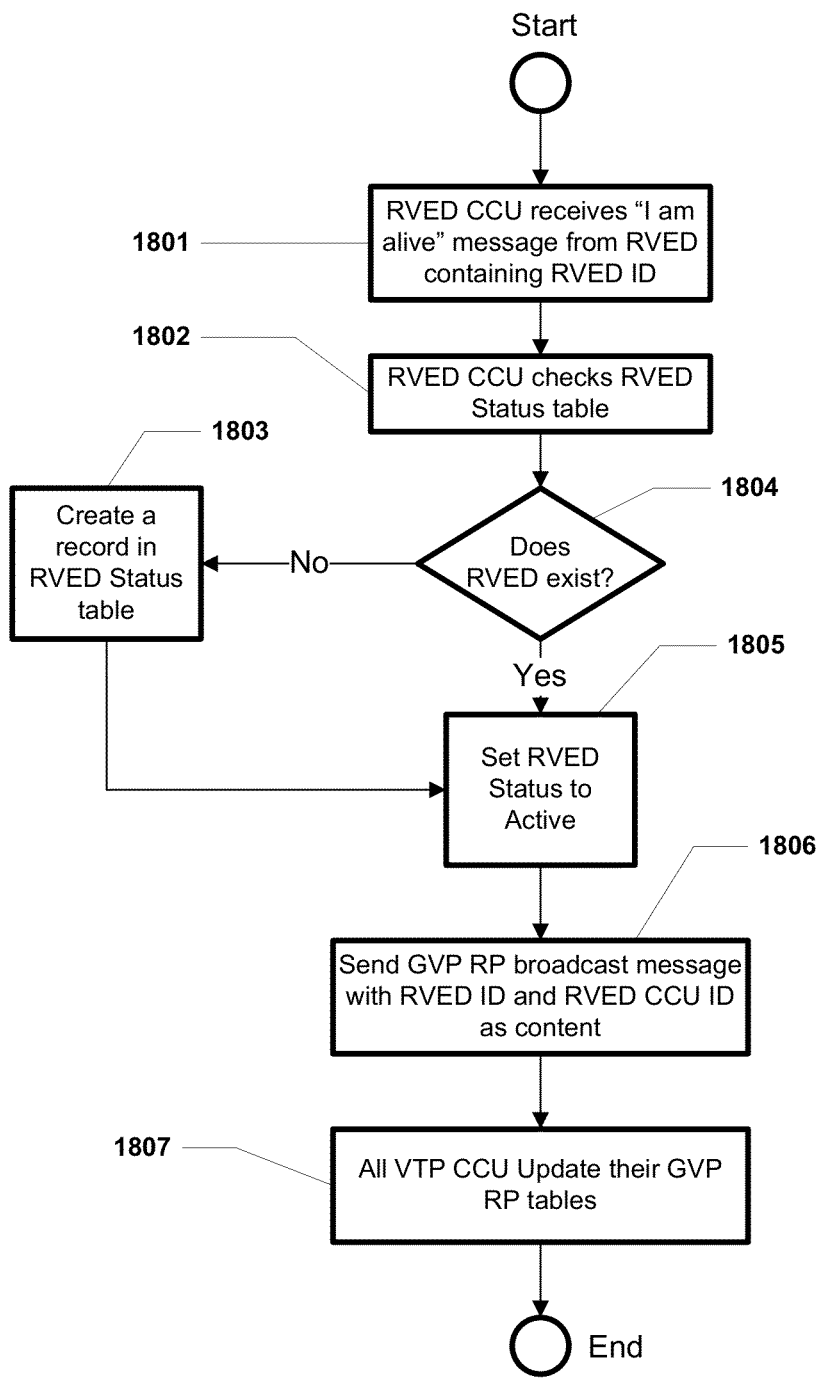
FIG. 18 illustrates RVED registration process, in accordance with the exemplary embodiment.

FIG. 18 illustrates RVED registration process, in accordance with the exemplary embodiment. FIG. 18 shows RVED registration process. When the RVED boots up for a first time and establishes high speed wireless link with the RVED CCU, the RVED CCU obtains the RVED ID from the RVED by sending GVP CCP "Request ID" command.

In response to this command, the RVED sends its unique GVP device ID in step 1801 to the RVED CCU. The RVED CCU checks the RVED CCU GVP RP table in step 1802 and, if a record for newly activated RVED does not exists in the table (step 1804), the RVED CCU creates a new record in GVP RP in step 1803 and sets RVED status to active in step 1805. After this operation is completed, the RVED CCU broadcasts newly activated RVED ID record to all VPT CCUs in step 1806, which update their GVP RP tables accordingly in step 1807.

According to the exemplary embodiment, a user interface implemented on the VPT can be of different forms and designs depending on a type of the VPT used. However, all types of the VPT interfaces include special buttons and menus for connecting the RVEDs and controlling them. All VPT interfaces include a User Account Management (UAM). The UAM is a software component, which provides the following functionality:

The UAM allows to change user class of service (COS):

Silver COS provides low transmission bandwidth, lower encryption level and limited number of virtual tours for the subscription period; and Gold COS provides high transmission bandwidth, higher encryption level and unlimited number of virtual tours for the subscription period.

The UAM allows to manage social network settings:

Edit profile;

Add/Delete friends; and

Search for friends.

The UAM allows to monitor every action performed with the GVP and provide:

Historical database;
Audit trial;
User name and password management;
Perform financial transactions;
Subscription services;
Advertisement;
Pay-per-view services;
Payments;
Sponsorship services; and
Data analytics statistics.

Figure 19:
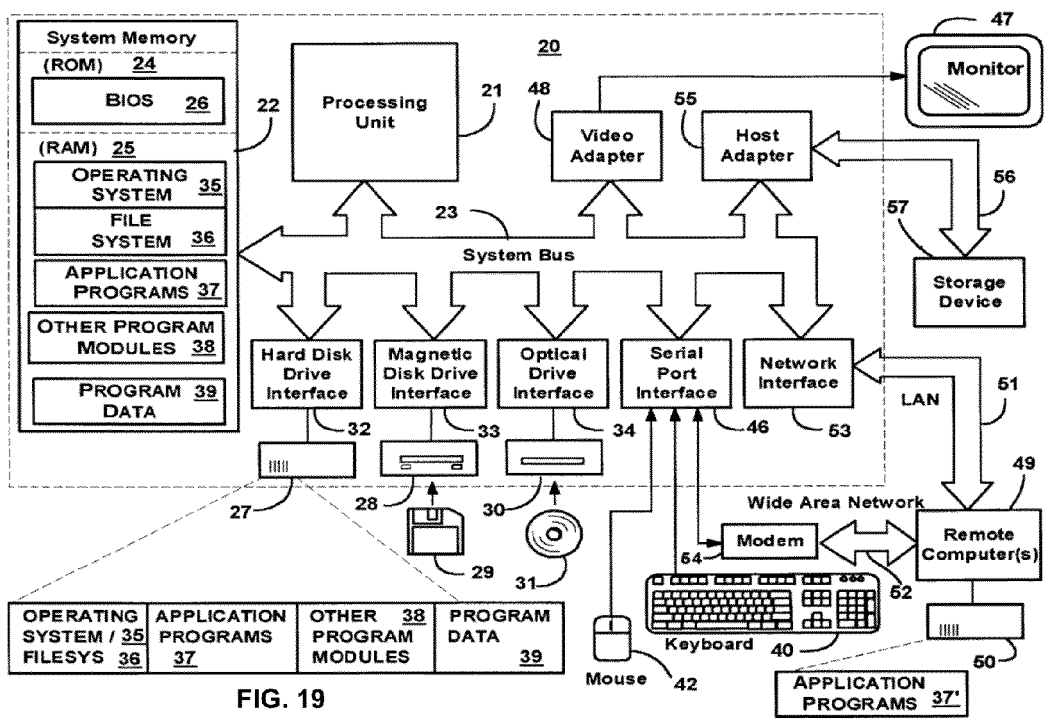
FIG. 19 illustrates a schematic of an exemplary computer system that can be used for implementation of components of the invention.

With reference to FIG. 19, an exemplary system for implementing the invention includes a general purpose computing device in the form of a computer/server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for interactive virtual presence to users at home. Thanks to the proposed method and system, regular people can, advantageously, see and experience many places on earth and beyond that they would never visit otherwise. Educational and scientific aspects of the present invention cannot be overestimated.

It should also be appreciated that various modifications, adaptations and alternative embodiments thereof may be made within the scope and spirit of the present invention. The invention is further defined by the following claims.

What is claimed is:

1. A Global Virtual Presence (GVP) system for providing a user with a virtual presence experience via a virtual reality, the system comprising:
   at least one virtual presence terminal (VPT) configured to provide a user with a virtual presence interface;
   at least one robotic virtual explorer device (RVED) configured to acquire a virtual presence media, the RVED is controllable by the user via the virtual presence interface;
   at least one VPT Command and Control Unit (CCU) connected to the VPT configured to process and send operational directives and receive the virtual presence media and render the virtual presence media to the user via the virtual presence interface;
   at least one RVED Command and Control Unit (CCU) connected to the RVED configured to process and send the operational directives to the RVED and receive and process the virtual presence media from the RVED, wherein:
   the VPT CCU is connected to the RVED CCU over a wide area network;
   the user connects to the RVED via the virtual presence interface and sends the operational directives to the VPT CCU;

the VPT CCU sends the operational directives to the RVED CCU, providing the operational directives to the RVED over a wireless connection;

the RVED acquires the virtual presence media and provides it to the RVED CCU over the wireless connection, which sends it to the VPT CCU over the wide area network;

the VPT CCU provides the virtual presence media to the VPT virtual presence interface;

a virtual geo-fence is mapped to a toured area containing movement of the RVED; and wherein the RVED is continuously controlled via virtual reality controls, and is configured to display a video feed as a virtual reality.

2. The system of claim 1, wherein the RVED is any of:
an aerial virtual explorer;
a marine virtual explorer;
a land virtual explorer; and
an extraterrestrial virtual explorer.

3. The system of claim 1, wherein the RVED has at least one video camera installed on it configured to capture a video stream based on the operational directives received from the user.

4. The system of claim 1, wherein the RVED CCU is connected to a plurality of the VPT CCUs.

5. The system of claim 1, wherein the RVED CCU is a remote server.

6. The system of claim 1, wherein the RVED CCU is a ground control station.

7. The system of claim 1, wherein the RVED has an array of video cameras configured to capture a view area of 360 degrees and providing 3D effects.

8. The system of claim 1, wherein the VPT CCU is a server hosting a pre-recorded video feeds database.

9. The system of claim 8, wherein the user receives the pre-recorded video feeds from the VPT CCU upon request.

10. The system of claim 1, wherein the VPT is any of:
a smart TV;
a tablet;
a computer;
a Smartphone;
3D glasses; and
a virtual reality helmet.

11. The system of claim 1, wherein the RVED CCU buffers the operational directives received from the VPT CCU and analyzes the operational directives according to safety of movements of the RVED identified in the operational directives.

12. The system of claim 11, wherein, if the operational directives are deemed unsafe by the RVED CCU, the RVED CCU corrects the directives and provides them to the RVED.

13. The system of claim 1, wherein the RVED buffers the operational directives received from the VPT CCU and analyzes the operational directives according to the safety of its movements as identified in the operational directives.

14. The system of claim 1, wherein the virtual presence media is any of:
a video stream;
an audio stream; and
sensory data.

15. The system of claim 1, wherein the user selects the RVED from a plurality of the available RVEDS presented to the user via the virtual presence interface.

16. The system of claim 1, wherein the RVED CCU determines where to route the video stream received from the RVED.

17. The system of claim 1, wherein the VPT CCU converts a video stream into a virtual reality stream that is compatible with a virtual reality end user terminal.

18. The system of claim 17, wherein the virtual reality end user terminal is a head mounted display (HMD).

19. A Global Virtual Presence (GVP) system for providing a user with a virtual presence experience via a virtual reality, the system comprising:

at least one virtual presence terminal (VPT) configured to provide a user with a virtual presence interface;

at least one robotic virtual explorer device (RVED) configured to acquire a virtual presence media, the RVED is controllable by the user via the virtual presence interface;

at least one VPT Command and Control Unit (CCU) configured to connect to the VPT and process and send operational directives and receive the virtual presence media and render the virtual presence media to the user via the virtual presence interface;

at least one RVED Command and Control Unit (CCU) configured to connect to the RVED and process and send the operational directives to the RVED and receive and process the virtual presence media from the RVED, wherein:

the VPT CCU is connected to the RVED CCU over a wide area network;

the user connects to the RVED via the virtual presence interface and sends the operational directives to the VPT CCU;

the VPT CCU sends the operational directives to the RVED CCU, which provides the operational directives to the RVED over a wireless connection;

the RVED acquires the virtual presence media and provides it to the RVED CCU over the wireless connection;

the RVED CCU sends the virtual presence media to the VPT CCU over the wide area network;

the VPT CCU is configured to provide the virtual presence media to the VPT virtual presence interface; and the virtual presence media, controlled by the user of the RVED, is indexed for playback requests by the users, and, the RVED is continuously controlled by the user via virtual reality controls.

20. A Global Virtual Presence (GVP) system for providing a user with a virtual presence experience, the system comprising:

at least one virtual presence terminal (VPT) configured to provide a user with a virtual presence interface;

at least one robotic virtual explorer device (RVED) configured to acquire a virtual presence media, the RVED is controllable by the user via the virtual presence interface;

at least one VPT Command and Control Unit (CCU) connected to the VPT and configured to process and send operational directives and receive the virtual presence media and render the virtual presence media to the user via the virtual presence interface;

at least one RVED Command and Control Unit (CCU) connected to the RVED, configured to process and send the operational directives to the RVED and receive and process the virtual presence media from the RVED, wherein:

the VPT CCU is connected to the RVED CCU over a wide area network;

the user connects to the RVED via the virtual presence interface and sends the operational directives to the VPT CCU;

the VPT CCU sends the operational directives to the RVED CCU, providing the operational directives to the RVED over a wireless connection;

the RVED acquires the virtual presence media and provides it to the RVED CCU over the wireless connection, which sends it to the VPT CCU over the wide area network;

the VPT CCU provides the virtual presence media to the VPT virtual presence interface; and the VPT is implemented on a virtual reality helmet, the virtual reality helmet controls movement of the RVED displaying video as virtual reality.

* * * * *